UNITED STATES PATENT OFFICE.

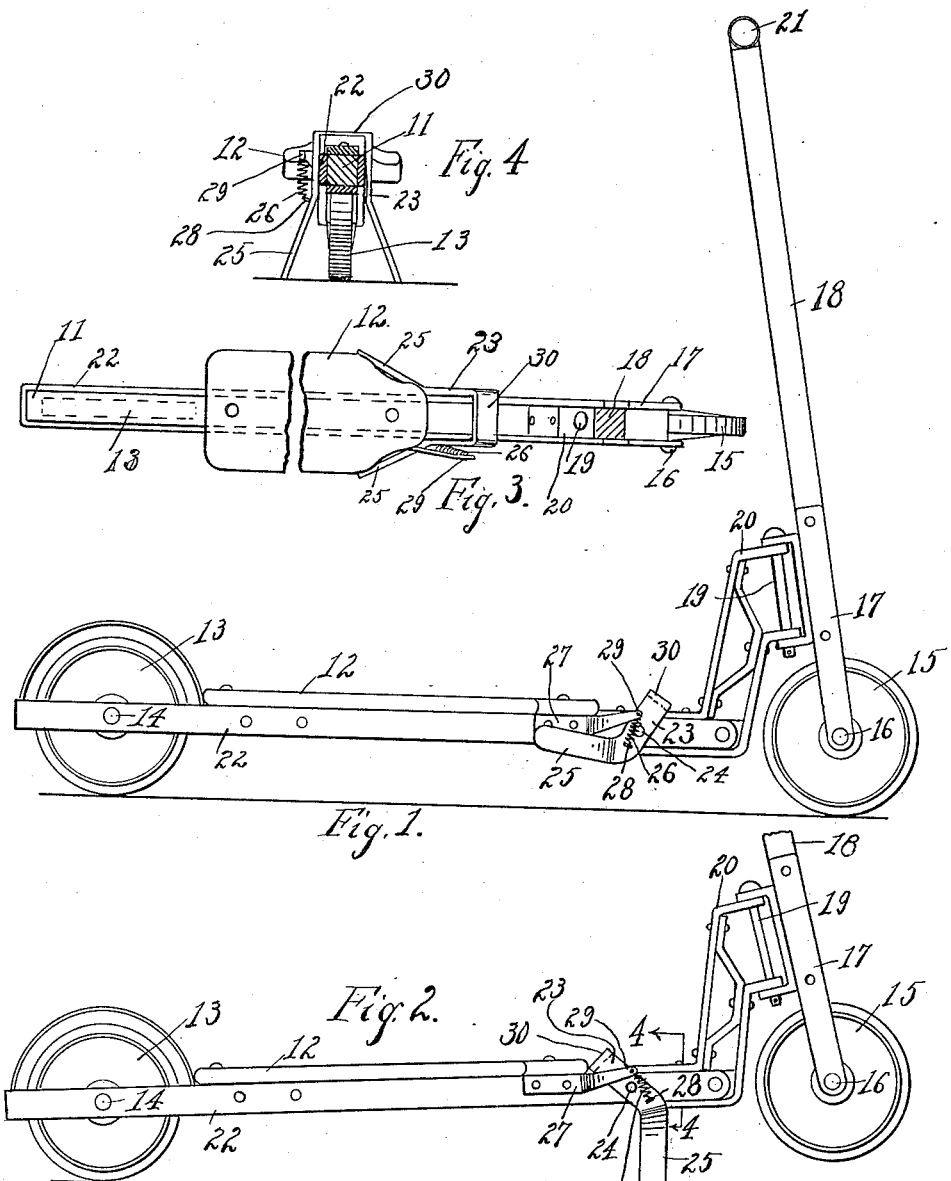

WILLIAM J. BAKER, OF NEWPORT, KENTUCKY.

SKATEMOBILE.

1,279,966.  Specification of Letters Patent.  Patented Sept. 24, 1918.

Application filed January 15, 1917. Serial No. 142,464.

*To all whom it may concern:*

Be it known that I, WILLIAM J. BAKER, a citizen of the United States, residing at Newport, in the county of Campbell and State of Kentucky, have invented certain new and useful Improvements in Skatemobiles, of which the following is a specification.

My invention relates to vehicles of the type generally known as skatemobiles, which comprise a footboard carried by a front and rear wheel or runner with a steering handle associated therewith, and has for its object the provision of means for holding the skatemobile in an upright position when not in use.

More particularly, it is the object of my invention to provide a support adapted to engage the ground at each side of the skatemobile, and which, when in operative position, will lift one of the wheels of the device from the ground, so that the skatemobile is firmly supported at three points, and prevented from accidental tipping or movement, the supporting member being further provided with means for holding the same in either its normal or unused position, or in supporting position.

The invention will be further readily understood from the following description and claim, and from the drawings, in which latter:

Figure 1 is a side elevation of a skatemobile with the supporting device turned up out of contact with the ground, so that the skatemobile may be used.

Fig. 2 is a similar view showing the support in operative position, with the front wheel of the skatemobile elevated from the ground.

Fig. 3 is a top plan view showing the supporting device in idle position; and,

Fig. 4 is a transverse vertical section on the line 4—4 of Fig. 2.

In the drawings, 11 represents a bar having side straps 22 secured thereto, forming the frame of the skatemobile. This frame has a foot-board 12 mounted thereon, and is supported at its rear by a wheel 13 journaled upon an axle 14 supported between the rearward extensions of the side straps 22. The front wheel 15 of the device, which is the steering wheel, is journaled upon an axle 16 carried by a fork 17 at the lower end of an upwardly extending steering rod 18 which is pivoted upon a pin 19 to the upwardly extending bracket 20, which is rigidly secured to the front end of the bar 11. The upper end of the steering rod is provided with a handle-bar 21 which is at such a level as to be conveniently grasped by the user of the skatemobile for steering the same, when standing upon the footboard.

The supporting device for the skatemobile comprises a fork 23 which straddles the frame, and is pivoted thereto at the front end of the foot-board 12 by a pin 24 extending through the side straps 22 and the bar 11.

The tines 25 of the fork, below the pivot 24, are rearwardly bent, and are also outwardly spread so as to form feet adapted to support the skatemobile at each side when the feet are projected toward the ground by turning the supporting fork upon its pivot. When the fork is turned in the opposite direction, the supporting feet will be moved to their idle position substantially parallel to the frame of the skatemobile, the movement of the fork in either direction being limited by the portion 30 of the same connecting the two tines engaging the frame of the device, as shown in Figs. 1 and 2.

The feet 25 are of such a length that when they engage the ground, the front wheel of the skatemobile will be lifted from the ground as shown in Fig. 2, the device thereby being supported by the rear wheel 13 and the outwardly spread feet 25 at each side of the skatemobile adjacent the front end thereof, thus providing a triangular support for the device which will firmly hold the same in its upright position.

A coil spring 26 is provided for holding the supporting device in either operative or inoperative position. It is connected at its upper end to the outer end 29 of an arm 27 secured to one side of the frame of the skatemobile, and at its lower end to a pin 28 on the tine of the supporting fork on the same side of the frame. The pin 28 is below the pivot 24 of the supporting fork, and the points 28 and 29 are so positioned relatively to this pivot point and to each other, that when the support is in its inoperative position as shown in Fig. 1, the longitudinal axis of the spring will be to the rear of the pivot, thereby tending to hold the support in such position, but when the support is swung to its operative position, as shown in Fig. 2, the axis of the spring will be at the other side of the pivot point, or in such a position as to hold the supporting feet in engagement with the ground.

It will also be noted that in changing the support from one position to the other, that as soon as the movement of the same has shifted the spring so that its axis passes from one side to the other of the pivot 24, the spring will tend to pull the support the remaining distance to its full operative or inoperative position, so that the supporting device is moved into and held in either of the positions by the tension of the same spring. When the device is in supporting position, the mere pushing forward of the vehicle will cause initiation of movement and the spring completion of movement of the fork into inoperative position.

Having thus fully described my invention, what I claim as new and desire to secure by Letters Patent, is:

The combination with a vehicle of the character described comprising a frame, of a fork having tines at each side of the vehicle frame and pivoted thereto, the said tines having normally rearwardly projecting lower ends lying in the plane of the frame in inoperative position and in substantially vertical position when in operative position, the upper connecting portion between the tines of the fork limiting the movement of the fork into its operative or inoperative position.

In testimony whereof, I have hereunto signed my name in the presence of two subscribing witnesses.

WILLIAM J. BAKER.

Witnesses:
 PHIL. W. TOZZER,
 CHARLES E. WEBER.

Copies of this patent may be obtained for five cents each, by addressing the "Commissioner of Patents, Washington, D. C."